3,009,886
Patented Nov. 21, 1961

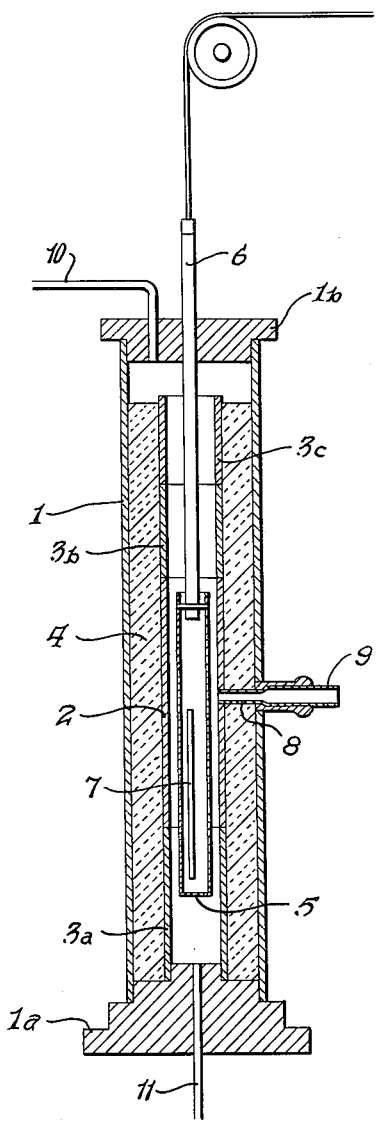

1

3,009,886
ELECTRICAL RESISTANCE HEATING
COMPOSITIONS
Axel R. Wejnarth, 97 Hamilton Blvd., Kenmore 17, N.Y.
Filed Sept. 10, 1958, Ser. No. 760,273
7 Claims. (Cl. 252—516)

This invention relates to improved sintered compositions suited for application as electrical resistance heating elements and refractory masses.

My United States Patents Nos. 2,445,296; 2,412,373; 2,412,374; 2,412,375; 2,412,376 and 2,406,275 disclose sintered masses which are said to be suitable for technical applications as electrical resistance heating elements and contain, as their main component silicon carbide, and as additional components, in smaller quantities, one or more borides, carbides, nitrides and silicides of beryllium, chromium, molybdenum, tungsten and vanadium. Such masses may also contain in smaller quantity one or more compounds of the group consisting of the borides, nitrides and silicides of iron, nickel and cobalt.

The present invention consists of a particular subgroup of improved sintered compositions related to but not within the scope of the large class described in claims 1 and 3 of U.S.P. 2,412,373 and U.S.P. 2,412,374. The large class of masses as it is defined in these patented claims, comprises electrical resistance elements each of which contains as its main component silicon carbide, and moreover in smaller quantity a chromium silicide, additionally a molybdenum silicide or a tungsten silicide, and optionally also an iron silicide. These defined compositions may contain also traces of metal compounds such as silicides and carbides of aluminum, manganese, beryllium, cobalt, nickel, titanium, zirconium and vanadium, one or more of which compounds may be present as impurities in commercial grades of the component materials used for preparing the sintered compositions.

Each composition of the sub-group of the present invention is characterized and distinguished from those defined in U.S.P. 2,412,373 and U.S.P. 2,412,374, by restrictive limitations of its components and by its distinctive, surprisingly superior qualities. Each such novel composition is a homogeneous solid solution effected by a sintering treatment of a mixture of silicon carbide particles and a metal-plus-silicon component which consists essentially of certain metals identified hereunder, and silicon which are intimately associated physically or chemically or partly physically and partly chemically in proportions which would be found if the metals and silicon were actually bound almost wholly as monosilicides. The particular metals thus associated in the metal-plus-silicon component consist essentially of chromium; at least one of the two metals tungsten and molybdenum; and optionally iron in an amount which at most equals that of chromium in the said component. A composition of the invention may contain a minute amount of other metals which usually are present as tolerable impurities in the commercial grades of the components from which the compositions are usually made.

The content of silicon, other than that bound in the silicon carbide of a sintered composition of the invention is limited to an amount which at most differs only by a few percent from that which would be present if the metal components of the composition were present only as monosilicides.

According to current authorities tungsten monosilicide as a chemical entity is unknown. In the sintered com-

2 positions of the present invention the principal metal components including permissive iron and the silicon which is not bound to carbon are intimately associated in almost exactly monatomic proportions; and this intimate association may be wholly chemical combination or alloyage, or partly the one and partly the other. For this reason the term "metal-monosilicide" hereunder in this specification and in the appended claims connotes such an intimate association of metal and silicon in monatomic proportions.

The new compositions are surprisingly and outstandingly strong mechanically, durable as heating units, stable electrically and resistive to corrosion at high temperatures.

An important characteristic of the compositions of this invention is that they are substantially free from uncombined and unalloyed silicon and oxygen-containing compounds of silicon. Moreover, the sintering and melting temperatures of such a solid solution can be raised by increasing the solution's content of silicide of either or both molybdenum and tungsten, and lowered by increasing the composition's content of silicide of chromium.

The components of an improved resistor composition of this invention may be mixed or compounded in any order before or during one or more sintering treatments. For example, the finely divided elementary metals in amounts proportioned to correspond to the prescribed amounts of metal "monosilicides" to be contained in a proposed composition of the invention, may be mixed in separate or alloyed forms with the appropriate amount of free silicon and converted to a mixed "monosilicide." A blend of requisite amounts of the formed metal "monosilicide" and silicon carbide in particle form may then be sintered to yield a mass containing the prescribed proportions of the several constituents.

In another method a component metal "monosilicide" may be formed in situ in a sintering mass. For example, a presintered mass is prepared as a mixture of the proportioned amounts of finely divided silicon carbide and either or both molybdenum "monosilicide" and tungsten "monosilicide." Additionally sufficient chromic oxide ($Cr_2O_3$), elementary carbon and elementary silicon are added to react and form the needed amount of chromium "monosilicide" in the mixture during the ensuing sintering step. In a similar manner the needed "monosilicides" of molybdenum and tungsten may be formed in situ.

Economy of manufacture of the novel sintered compositions invites the use of available commercial grades of silicon carbide, which generally contain between 1 and 3 percent of metal and non-metal impurities. Such silicon carbide can therefore carry at least some of its impurities into the sintered composition for which it is used. The metal impurities introduced in this manner into novel composition of the invention have little effect on the characteristics of the compositions, and therefore are tolerable. The non-metallic impurities vary in different commercial silicon carbides. "Black" silicon carbide contains uncombined carbon; and "green" silicon carbide contains free silicon. These carbides generally contain also more or less silicon compounds such as silicon dioxide ($SiO_2$), silicon carbonyl ($SiCO$), and siloxicon ($Si_2C_2O$).

I have found that the presence of free silicon and non-metallic silicon-containing impurities in a sintered composition, has a marked degrading effect upon the efficacious life of the composition as an electrical resistance heating element and as a refractory mass. These silicon containing impurities tend to gather in alien colonies which become hot spots and originating loci of progressive disintegration when the impurity-containing composition is used as an electrical resistance heating element. Such an impurity-containing composition has been found to fail after operating for a relatively small number of hours at a temperature as low as 1650° C.

Free silicon, whether it be introduced into or formed in a sintered composition is expelled only very slowly even by inordinately long heating of the mass at high temperatures for example 2400° C.

I have discovered several novel, adequate and inexpensive methods for effectively converting free silicon in a presintered resistor composition into metal silicide or into silicon carbide during the sintering procedure for preparing a composition of this invention. By such methods, low-cost commercial "green silicon carbide" as well as "black silicon carbide," despite any content in them of free silicon and carbon can be used directly for the manufacture of sintered resistor compositions which do not contain any elementary silicon or oxygen-containing compounds of silicon.

In a preferred method free carbon is incorporated in a presintered composition in which green silicon carbide is incorporated. The carbon is adjusted to an amount at least sufficient to convert into silicon carbide elementary silicon which is introduced into the presintered composition by the green silicon carbide, as well as silicon which may be formed during the sintering process. In such a process the proportions of components required by a selected formula for a resistor composition are adjusted to take into account additional silicon carbide which is expected to be formed during the sintering treatment. In general the amount of free carbon incorporated is somewhat in excess of that needed theoretically. The introduction of a moderate excess of carbon is much less objectionable than other impurities, especially silicon and oxygen-containing compounds of silicon, because the excess carbon oxidizes readily to a carbonic gas when the resistor mixture is exposed at a high temperature to an oxidizing atmosphere, for example air.

The same result is achievable by sintering a mixture which is compounded of the proportioned amounts of metal and silicon components and of a mixture of green and black silicon carbide. The amounts of these carbides are so proportioned that the sum of their silicon carbide contents, and the carbide to be formed during the sintering treatment will be the proportioned amount of silicon carbide required by the selected compounding formula for the sintered composition.

For the sintering treatment the mixture may be compressed into a surrounding carbonizable container, for example, a paper tube, which can function during the sintering treatment to shape the composition, and by its own carbonization to supply in whole or part, the needed carbon and an environmental carbonaceous gaseous atmosphere around the sintering mass to convert the compositions' content of free silicon to silicon carbide. Such a reactive carbonaceous gaseous atmosphere around the resistor composition as it is being sintered, is comparable to a carbon monoxide gas containing up to about 30% by volume of hydrogen. In another convenient procedure the composition which contains elementary silicon is sintered within an atmosphere able to supply the needed carbon, for example a stream of hydrocarbon gas or vapor.

Furthermore, an unsintered resistor composition which is prepared from components comprising free silicon may be compounded with a carbonaceous temporary binder, e.g. a resin, conveniently dissolved in a suitable solvent, such as a ketone, to supply, in whole or part the carbon required to convert the silicon to silicon carbide during the subsequent sintering treatment which may be effected in a gaseous or vapor environment.

I have found that several advantageous effects accrue from the conversion of elementary silicon to silicon carbide during the sintering of the presintered composition. The concomitance of conversion, recrystallization of the silicon carbide, and formation of a solid solution of all the silicide components in the composition, results in a substantially homogeneous mass of intimately mixed and cohering crystalline grains of the contained silicides of carbon and metals. Intervening bridges and colonies of free silicon and oxygen-containing silicon components are not formed to function as undesirable loci for incipient disintegration with consequent premature failure of the sintered resistor masses when they are applied as electrical resistance heating elements or as refractory masses.

The essential metals of the sintered compositions of this invention oxidize readily when heated in an oxidizing atmosphere. They also react with silicon carbide at relatively high temperatures to form metal silicides. A surprising and important feature of the present invention is that when the metals as "monosilicides," or the metals and silicon in monatomic proportions are alloyed by heating with each other and with a relatively large amount of silicon carbide, they form compositions which as shown by their X-ray diffraction patterns are homogeneous solid solutions. The compositions are surprisingly resistant even at relatively high temperatures to oxidation and chemical attack and are particularly suited for use as electrical heating elements.

The sintering treatments of the following examples illustrate the invention and were carried out in a high frequency furnace which is represented diagrammatically in the figure. Inside a quartz tube 1 fitted with a suitable bottom closure and support 1a and a removable top closure 1b, a graphite tube 2 is held in place by two raw carbon supports 3a and 3b and a ceramic tubular extension 3c. Graphite tube 2 functions as the electrical susceptor. The annular space 4, between the quartz tube 1 and the graphite tube 2 with its supports and extension, is filled with heat-insulating material. Within the susceptor tube 2 a graphite crucible 5 is suspended by a movable rod 6 whereby the crucible and the contained sample 7 therein can be moved up and down at a desired regulated rate. The temperature and progress of the sintering treatment can be observed through a raw carbon sight-tube 8 and a sillimanite tube 9 suitably aligned with the sight-tube 8 but at a point about midway between the susceptor tube ends. An inlet tube 10 and an outlet tube 11 provide means for conducting a protective gas through the graphite tube 2 and around the crucible 5 and the sample 7.

Normally the rate of movement of the sample within the furnace was adjusted to maintain a negligible temperature lag between the crucible with its sample and the susceptor.

The progressive effect of the sintering treatment was noted by measurements of the electrical resistivity of the heating sections, and the total sintering effect was evaluated by a "life test" which consisted of operating the finished section continuously as an electrical heating element at a temperature between 1650° C. and 1700° C.

The novel interactions of metal "monosilicides" and silicon carbide were investigated and reproduced in a series of preparations of sintered compositions which were subjected to microscopic and X-ray examinations for structural characteristics.

Each composition was prepared by sintering a mixture of a portion of a single uniform lot of silicon carbide and one member of a series of different metal-silicon mixtures which were prepared previously.

Percentagewise the several metal-silicon mixtures contained the quantities of metals and silicon shown in the following Table 1. In each case the proportions by weight of metals and silicon were identical with those which would exist if each metal and silicon in the mixture were in fact combined as metal "monosilicide." The intimate presintered mixtures were in powdered form.

TABLE 1

| Test No. | 1 | 2 | 3 | 4 | 5 | 6 | 7 |
|---|---|---|---|---|---|---|---|
| Component | Percent of components | | | | | | |
| Iron | 66.52 | | 28.54 | | 11.39 | | 9.27 |
| Chromium | | 64.94 | 37.07 | | | 13.98 | 12.05 |
| Tungsten | | | | 86.75 | 71.99 | 68.07 | 58.58 |
| Silicon | 33.48 | 35.06 | 34.39 | 13.25 | 16.62 | 17.95 | 20.10 |
| Total | 100 | 100 | 100 | 100 | 100 | 100 | 100 |

A portion of the metal-silicon mixture to be tested was enclosed in a small graphite cylinder and surrounded the embedded end of a silicon carbide rod which functioned as a heating section. The embedment was heated to about 2400° C. to form a molten layer of 2–3 mm. thickness around the rod end. Contact of molten layer and rod end was maintained for 10 minutes to ensure clear evidence of the course of any interaction of the embedment and the silicon carbide rod.

Each reacted composition was subjected to microscopic and X-ray examinations to detect and evaluate differences in the appearances of the compositions as significant evidence of their structures.

The patterns of a solution of metal mono-silicide and silicon carbide were clearly distinguishable from those of other areas of the interaction product.

Microscopic examination revealed alien areas in specimens of Tests Nos. 1, 2, 3 and 5, and none in those of Tests Nos. 4, 6 and 7. The most pronounced detectable chemical reaction appeared in Test No. 3 and the least appeared in Tests Nos. 6 and 7.

These results prima facie indicate that within the ranges of proportions of components and under the conditions used in these tests:

(1) Iron, or chromium, or a mixture of only two metals, in the presence of silicon and silicon carbide, vigorously react chemically with silicon carbide;

(2) Tungsten in the presence of silicon and silicon carbide does not react noticeably with silicon carbide;

(3) In each of the mixtures of silicon and silicon carbide with (a) tungsten and iron only, or (b) tungsten and chromium only or (c) tungsten, iron and chromium, the tungsten suppresses greatly the reactivity of the iron; it completely suppresses the reactivity of chromium, and of the mixture of chromium and iron.

In compositions Nos. 5, 6 and 7 the presence of an unidentified substance was noted. To identify this substance five synthetic alloys were prepared from tungsten, chromium and silicon in proportions which were adjusted to represent the molecular ratios of virtual tungsten "monosilicide" and chromium "monosilicide" shown in Table 2.

TABLE 2

*Relative content of the composition*

| Alloy | A | B | C | D | E |
|---|---|---|---|---|---|
| W+Si | 1.4 | 1.2 | 1.0 | 0.8 | 0.6 |
| Cr+Si | 0.6 | 0.8 | 1.0 | 1.2 | 1.4 |
| Total | 2.0 | 2.0 | 2.0 | 2.0 | 2.0 |

X-ray examinations of these synthetic alloys revealed an X-ray diffraction pattern, which was seen previously in the examinations of the heating sections, and was present in all of these alloys as primary solutions of a tungsten "monosilicide" structure. The examinations also revealed, by characteristic shifts of these patterns, that (1) alloys of silicon and chromium other than the "monosilicide" were present and became more prominent with increased content of chromium in the alloy; and (2) in the alloys represented in Table 2 above as "A" and "B," wherein the chromium content was relatively small, elementary silicon was present.

The improved desirable characteristics of the novel compositions of the invention are related to the limited proportions of the compositions' particular constituent components and to the manner of conducting the sintering process by which the said compositions are prepared.

The improved compositions which are particularly effective contain between about 50% and 98% by weight of silicon carbide.

When an improved sintered mass for application as an electrical resistance heating element is being prepared, it is advantageous to adjust the weight ratios of the metal-silicon component and the selected silicon carbide in relation to the impurities and the grain size of the silicon carbide and the desired electrical resistivity of the section of the composition which is to function with a uniform current distribution and ohmic resistance.

Generally, an increased content of the metal-silicon-component in a sintered composition is accompanied by a lowered ohmic resistivity of the mass. When such a mass is used as an electrical heating section, it requires an increased amperage for effective operation. In turn, this need entails higher cost of operation and other disadvantageous consequences.

The size of grains of silicon carbide which is incorporated in a sintered composition has a noticeable effect on the ohmic resistivity of the composition. Those prepared from fine grain silicon carbides require proportionately larger amounts of metal silicon component, than are required by compositions made from large grain carbides.

Adjustments for the foregoing variants are readily made by incorporating amounts of metal-silicon components from the allowable wide range of between about 48% and 2% of the weight of the final composition.

The preferred metal silicon components consist essentially of tungsten chromium, and silicon, and optionally iron in the following proportioned amounts expressed as percentages by weight of the total weight of an incorporated component.

Tungsten between 80% and 40%.
Chromium between 35% and 5% provided iron is not included. In the alternative if iron is used, the chromium plus iron may be adjusted within the ranges.
Chromium between 17.5% and 2.5%.
Iron between 17.5% and 2.5%.
Silicon in an amount which is substantially limited to the content of only one atom of silicon per atom of metal in the metal-silicon component.

The use of both chromium and iron in a composition tends to lower the melting temperature of the composition, but such an effect can be offset by increasing the content of tungsten. The needed increase of tungsten can be determined readily by routine testing.

In the sintering process, the purity of the silicon carbide phase, the temperature of incipient decomposition or graphitization of the silicon carbide, the composition of the silicides, and the duration of the sintering treatment influence the characteristics of the sintered product. While green silicon carbide has an incipient decomposition temperature of about 2350° C. to about 2500° C. the corresponding temperature for black silicon carbide ranges from about 2200° C. to about 2350° C. depending upon the amounts and kinds of the contained impurities. When the sintered compositions of this invention are prepared from black silicon carbide and the appropriate metal silicides, tthe adequate sintering temperature is generally above that of incipient decomposition of the black silicon carbide alone. The need for a higher sintering temperature appears to be related to iron silicide which is introduced as such, or is formed from an iron-compound contained in the black silicon carbide, and thereby carried into the presintered composition.

The following examples illustrate the invention. The percentages of constituents relate to weights.

*Example I.*—A composite, uniform mixture for sintering was compounded from a granulated form of commercial silicon carbide containing 0.2% free carbon, 0.35% free silicon and 0.35% silicon dioxide; commercial tungsten powder containing 3.9% free carbon; chromium sesquioxide ($Cr_2O_3$); free carbon; and as a binder and source of silicon, commercial aqueous sodium silicate (Grade 0) which contained 0.1284 gram $Na_2O$ and 0.4136 gram $SiO_2$ corresponding to 0.1933 gram silicon per milliliter of the aqueous solution. These components were proportioned by weight as follows:

Tungsten powder—3.55 parts containing 3.41 parts tungsten and 0.14 part free carbon;
Chromium oxide ($Cr_2O_3$)—1.81 parts equivalent to 1.24 parts chromium and 0.57 part oxygen;
Free carbon—1.9 parts.
Sodium silicate—4.34 parts equivalent to 1.55 parts silicon, 2.03 parts oxygen, and 0.76 sodium;
Commercial silicon carbide—93.8 parts.

During the sintering treatment these react to form a solid solution consisting essentially of;

3.93 parts tungsten "monosilicide."
1.91 parts chromium "monosilicide."
94.8 parts silicon carbide.

Oxygen is removed as carbon monoxide, and sodium is removed from sodium carbide.

Four shaped sections of the composition were formed to serve as test electrical heating elements. Each was fed continuously into a graphite-tube furnace and sintered according to conditions of temperature, speed through the hot zone, and duration of exposure to the hot zone in the furnace shown in Table 3 hereunder. The gaseous products emanating from the heated sections were carried away in a slow stream of inert gas which was conducted continuously through the furnace and over the sintering sections.

Spectrographic analysis of the sintered heating sections showed that sodium was expelled during the sintering treatments of the sections.

The results of tests as heating elements applied to the sintered sections thus prepared, are shown in Table 3.

tion was welded to terminal conductors and tested as an electrical heating element.

The conditions of sintering and results of tests are summarized in the following table:

| Number of element | Duration in Hours | | Total Time, hours (a)+ (b) | Resistance in ohms | | Life test continuous operation at 1650° C. | |
|---|---|---|---|---|---|---|---|
| | Preliminary sintering at 2,300° C. (a) | Resintering at 2,350° C. (b) | | (a) | (b) | Resistance in ohms | Hours |
| 1 | 1.50 | 2.50 | 4.00 | 2.29 | 0.91 | 1.60–1.72 | [1] 491 |
| 2 | 2.25 | 3.00 | 5.25 | 1.26 | 0.595 | 1.02–1.10 | [2] 731 |

[1] The test was discontinued when the element showed a break, and chemical attack on the heating section and the weld at one terminal.
[2] The test was discontinued when a defect developed in the weld between the intact heating section and one terminal.

The example illustrates the effect of both temperature and duration of the sintering treatment upon the durability of the sintered heating sections. It indicates that the sintering temperature should be adequate to achieve penetration of the silicon carbide particle surfaces by the metal monosilicide, and the duration of sintering should be adequate to attain maximum durability.

*Example III.*—A composite uniform mixture for sintering was compounded from commercial silicon carbide similar to that used in Example I; chromium sesquioxide ($Cr_2O_3$); tungsten powder containing 0.3% free carbon; ferrosilicon with a 75% content of silicon, and free carbon. The amount of free carbon incorporated was 10% above that needed theoretically to deoxygenize the chromium sesquioxide to metallic chromium, and to convert free silicon to silicon carbide. The components were proportioned to yield a sintered mass containing 93.91% silicon carbide and 6.07% metal monosilicide component in which the proportions, percentagewise, of the component metal and silicon elements were very close to 58% tungsten, 11.9% chromium, 9.1% iron and 20.9% silicon.

TABLE 3

[NOTE.—In this table "Speed" signifies inches per minute of passage of sample in hot zone of graphite tube furnace. "Time" signifies duration in minutes of presence of sample in hot zone of graphite tube furnace]

| Number of element | Preliminary sinter | | | Resinter | | | Total sinter time | Resistance in ohms after resinter | Modulus of rupture, p.s.i. | Life test: Continuous operation at 1,650° C. | |
|---|---|---|---|---|---|---|---|---|---|---|---|
| | Temp., °C. | Speed | Time | Temp., °C. | Speed | Time | | | | Percent change in resistance after test | Duration of test. hours |
| 1 [1] | 2,350 | 0.5 | 66 | | | | 66 | 5.7 | Ca. 5,000 | −19.8 | 232 |
| 2 [1] | 2,350 | 0.5 | 66 | | | | 66 | 9.5 | Ca. 5,000 | −26.9 | 235 |
| 3 [2] | 2,350 | 0.5 | 66 | 2,350 | 0.5 | 66 | 132 | 1.67 | Ca. 5,000 | −20.6 | 122 |
| 4 [2] | 2,350 | 0.5 | 66 | 2,350 | 0.5 | 66 | 132 | 1.48 | Ca. 5,000 | −11.6 | 386 |

[1] Heavy smoke was noted when the tests were started; heavy grayish-green precipitation was noted on the elements.
[2] Heavy smoke was noted when the tests were started; heavy white precipitation was noted on elements.

*Example II.*—A composite mixture was compounded of green silicon carbide and a metal silicon mixture in amounts proportioned to yield, a sintered mass consisting essentially of 93.93% silicon carbide and 6.07% metal silicides wherein the component elements were tungsten 58.0%; chromium 11.9%; iron 9.1%; silicon 20.9%. A surplus of 4.1% silicon existed. The mixture was compressed into paper tubes and sintered. Each sintered sec- Each of several portions of the presintered mixture was rammed into a paper tube and sintered. The sintered heating sections were welded to conducting terminals and tested as electrical heating elements.

The conditions of the sintering steps, and the results of life tests by continuous operation at 1650° C. are shown in the following table.

TABLE 4

[NOTE.—In this table "Speed" signifies inches per minute of passage of sample in hot zone of the high frequency furnace. "Time" signifies duration in minutes of presence of sample in hot zone of the high frequency furnace.]

| Number of element [1] | Preliminary sinter | | | Resinter | | | Total sinter time | Resistance in ohms after sinter | Modulus of rupture, p.s.i. | Life test: Continuous operation at 1,650° C. | |
|---|---|---|---|---|---|---|---|---|---|---|---|
| | Temp., °C. | Speed | Time | Temp., °C. | Speed | Time | | | | Percent change in resistance after test | Duration of test, hours |
| 1 | 2,350 | 0.14 | 180 | 2,400 | 0.15 | 165 | 245 | 1.87 | Ca. 5,500 | −11.4 | [2] 687 |
| 2 | 2,340 | 0.14 | 180 | 2,400 | 0.15 | 165 | 245 | 1.85 | Ca. 5,500 | −6.4 | 1,008 |

[1] No smoke emanated from the elements when the tests were started. Some white precipitate appeared on the surface of Element No. 1, and a barely perceptible precipitate appeared on that of Element No. 2.

[2] A defect developed in the weld between the heating section and one terminal.

The gaseous decomposition products of the paper tubes and the reduction gases formed in the sintering mixture moved vertically through the enclosed space of the high frequency furnace which was provided with a gas outlet at the top. By their reducing action the gases contributed to the favorable characteristics of the heating sections.

*Example IV.*—In this example the presintered composition of each heating section was a duplicate in percentage contents of the presintered compositions of Example III. Each portion of the composition was compressed into a paper tube. The composition for the heating section of element No. 1 was sintered at 2200° in the high frequency furnace for 2 hours, resintered in stationary position at 2500° in a graphite tube furnace for 1½ hours, and resintered again in the same furnace at 2350° for an additional 1½ hours. The heating section became severely graphitized during the first resintering treatment, especially at its ends. The heating section of element No. 2 was sintered at 2200° C. for 2 hours in the high frequency furnace, resintered for 2 hours in stationary position at 2375° C., and resintered again for 1½ hours at 2375° C. in the same furnace. Both heating sections became graphitized. The results of tests to which these sections were subjected as electrical heating elements are shown in Table 5.

TABLE 5

| Element No. | Hours of operation | Temp., °C. on element | Ohmic resistance after 3rd resintering | Modulus of rupture, p.s.i. | Percent change in resistance after life test |
|---|---|---|---|---|---|
| 1 | [1] 262 | 1,700 | 1.46 | Ca. 8,000 | +9.3 |
| 2 | [2] 253 | 1,700 | 1.24 | Ca. 8,000 | +8.6 |

[1] The heating section loosened from one weld; the previously graphitized heating section was severely damaged at the other weld. The remaining part of the heating section was without damage and functioned satisfactorily.

[2] The heating section loosened at one weld but the other though somewhat damaged remained unbroken. The heating section itself was not damaged and functioned satisfactorily.

Remarks: No "smoke" emanated from the heated masses when the tests were started; and sparse precipitation appeared on the surfaces of the heating sections.

*Example V.*—In this example the presintered mixture was composed of commercial silicon carbide, commercial tungsten, chromium sesquioxide and carbon. These components were so proportioned that the final sintered composition containing 92% silicon carbide and 8% metal monosilicide. This metal "monosilicides" portion was adjusted to the desirable condition that the proportions of its metal and silicon components corresponded closely to a mixture of 0.75 mol. tungsten "monosilicide" (WSi) and 1.25 mol. chromium "monosilicide" (CrSi), i.e., a content of 53.2% tungsten; 25.1% chromium and 21.7% silicon. Thus, if the metal "monosilicides" portion be regarded as weighing 8 parts, the portions of its constituents are 53.2% of 8 parts i.e. 4.26 parts tungsten; 25.1% of 8 parts, i.e. 2.007 parts chromium which is derived from 2.93 parts of chromium sesquioxide; and 21.7% of 8 parts i.e. 1.73 parts of combined silicon supplied by reaction of the metals with minute amount of free silicon and silicon dioxide in the carbon silicide and a part of the silicon carbide charge. The carbon so liberated thereby was supplemented by an addition of free carbon in amount equal to about 1% of the silicon carbide charge of the mixture. The addition was introduced to assure full reduction of chromium sesquioxide to chromium and to convert free silicon to silicon carbide. Additionally incineration of the paper tubes used for holding the mixture during the initial stages of the sintering treatment produced reducing carbonaceous gases in the graphite tube furnace during the sintering treatment. These gases were diluted by inert gas introduced at the discharge end of and conducted through the furnace. The amount of reduction carbon added for conversion of chromic oxide ($Cr_2O_3$) to metal was adjusted to 110% of that theoretically required.

The results of two tests as electrical heating elements to which the composition, prepared according to the foregoing conditions was subjected are shown in Table 6.

TABLE 6

| Number of element | Hours of operation | Temp., °C. on element | Ohmic resistance after sintering | Modulus of rupture, p.s.i. | Percent change in resistance after life test |
|---|---|---|---|---|---|
| 1 | [1] 384 | 1,650 | 1.42 | Ca. 9,500 | +1.3 |
| 2 | [1] 384 | 1,650 | 1.00 | Ca. 9,500 | +6.6 |

[1] No defects; the tests were interrupted.

Remarks: In each case no smoke was expelled when the test started; and there were only traces of precipitation on the surface of the element.

The relatively small amount of carbon added to react with free silicon which was present initially or was liberated during sintering treatment, permitted a reduction in the period of sintering in one operation to about one third of that used in Example III. In a following experiment the amount of carbon was increased from 1% to 2.3% of the silicon carbide phase. An additional increase was noted in the mechanical strength, durability and resistance to chemical actions of the final resistor, although not in proportion to the increased amount of carbon. In a variation of Example V, a replacement of about half of the chromium content by iron and an adjustment of tungsten and silicon in the metal-silicon component resulted in a lowering of the melting point of the mass and enabled a reduction of the sintering temperature by about 200° C.

In the sintering treatment it is important to adjust and maintain the sintering temperature for a period which is necessary to effect completion of the interpenetration of silicon carbide by the metal monosilicide. In practice the best resistor quality results when the sintering temperature, which is generally between 2200° C. and 2450° C., is maintained at a level very close to but below that at which incipient decomposition of the silicon carbide phase appears. The signs indicate that the metal silicon components of the admixture are actively interpenetrating in the lattice structure of the silicon carbide particles by a wetting phenomenon. Sintered compositions so made and applied as electrical resistance heating elements have maximal mechanical strength capable of withstanding 10,000 p.s.i. in rupture (fracture) tests, electrical stability and chemical durability in high temperature environments.

Theoretically, the amounts of components incorporated in a selected type of resistor composition to be sintered are proportioned precisely according to a specific formula. In practice avoidance of small errors because of small variations, for example in percentage contents and kinds of constituents of the initial materials, especially commercial grades of such materials is extremely difficult. Effects of even relatively small variations are noticeable in the characteristics of the final resistor mass. Such effects, by their extent and character, indicate the extent and nature of the adjustments, if needed, of formula and materials. Particularly, when the invention is applied technically with commercial grades of materials it is desirable that the materials be subjected to a preliminary test to determine their suitability or amenability to corrective action before or during the application.

The improved resistor compositions of the invention have the physical and chemical characteristics already noted above which qualify them for uses such as electrical resistance heating elements; electrical resistance elements in shaped, grain and powder forms; heat resisting coatings; and as refractory masses and shapes—which, if necessary, may be formed by sintering in situ—for jet aeroplanes and atomic energy reactors. To form an electrical conducting lead to another conductor or electrodes, an end of the latter may be dipped in a molten sintered composition of the invention to form and build up an attachment to the conductor end by an integrated junction. A sintered resistor composition of the invention may be welded to the end of another conductor. It may be applied in molten state to form an impervious and protective coating on the surface of another conductor or of a refractory mass.

It is to be understood that the claims hereunder describing the compositions of this invention embrace compositions which are prepared from commercial grades of materials and as a consequence of this mode of preparation may contain harmless minute quantities of impurities which derive from the said materials.

In the following claims parts and percentages represent weights.

I claim:

1. A sintered composition adapted for use as an electrical resistance heating element or refractory mass, obtained by preparing an intimate finely divided mixture consisting essentially and percentagewise of between about 50 percent and about 98 percent of silicon carbide, the balance of the said mixture being a metal-silicon component consisting essentially and proportionately of between 16 and 8 parts of at least one of the two metals tungsten and molybdenum; between 7 parts and 1 part of chromium plus iron, the maximum amount of iron being equal to that of included chromium; and an amount of silicon substantially limited to the content of only one atom of silicon per atom of metal in the metal-silicon component; sintering the said intimate mixture between about 2000° C. and about 2450° C. until the sintering mass becomes a homogeneous solid solution free from uncombined silicon.

2. The sintered composition according to claim 1 wherein the metal-silicon component consists essentially of tungsten, chromium and silicon.

3. A sintered composition adapted for use as an electrical heating element or refractory mass, obtained by preparing an intimate finely divided mixture consisting essentially and percentagewise of between about 92 percent and about 98 percent of silicon carbide, the balance of the said mixture being a metal-silicon component consisting essentially and proportionately of between 16 and 8 parts of tungsten, between 7 parts and 1 part of chromium plus iron, the maximum amount of iron being equal to that of included chromium; and an amount of silicon substantially limited to the content of only one atom of silicon per atom of metal in the metal-silicon component; sintering the said intimate mixture between about 2200° C. and about 2450° C. until the sintering mass is a homogeneous solid solution free from uncombined silicon.

4. The sintered composition according to claim 3 wherein the metal-silicon component consists essentially of tungsten, chromium and silicon.

5. The process for preparing a sintered composition adapted for use as an improved electrical resistance element which comprises intimately mixing between about 50 and about 98 parts of finely divided silicon carbide with between about 50 and about 2 parts of a finely divided metal-monosilicide component consisting essentially of the alloyed form of between 16 and 8 parts of tungsten, between 7 parts and 1 part of chromium plus iron, the maximum amount of iron being equal to that of chromium; and silicon in an amount which is substantially limited to the content of only one atom of silicon per atom of metal in the metal-monosilicide component; and sintering the mixture at a temperature between about 2200° C. and about 2450° C. until the mass becomes a homogeneous solid solution.

6. The process for preparing a sintered composition adapted for use as an improved electrical resistance element which comprises intimately mixing between 92 and 98 parts of finely divided silicon carbide, and between 8 and 2 parts of a finely divided metal-monosilicide component consisting essentially of the alloyed form of between 16 and 8 parts of tungsten, between 7 and 1 parts of chromium plus iron, the maximum amount of iron being equal to that of included chromium; and silicon in an amount which is substantially limited to the content of only one atom of silicon per atom of metal in the metal-monosilicide component; and sintering the mixture at a temperature between about 2200° C. and about 2450° C. until the mass becomes a homogeneous solid solution.

7. The process for preparing a sintered composition adapted for use as an improved electrical resistance element which comprises intimately mixing 92 parts of silicon carbide; 4.26 parts tungsten; 2.93 parts chromium sesquioxide, about 1.75 parts additional silicon carbide and about 1 part free carbon; sintering the mixture in a stream of hydrocarbonaceous gas, at a temperature between about 2200° C. and about 2450° C. until the mass becomes a homogeneous solid solution.

References Cited in the file of this patent

UNITED STATES PATENTS

| | | |
|---|---|---|
| 2,406,275 | Wejnarth | Aug. 20, 1946 |
| 2,412,373 | Wejnarth | Dec. 10, 1946 |
| 2,412,374 | Wejnarth | Dec. 10, 1946 |
| 2,412,375 | Wejnarth | Dec. 10, 1946 |
| 2,412,376 | Wejnarth | Dec. 10, 1946 |
| 2,445,296 | Wejnarth | July 13, 1948 |
| 2,622,304 | Wallace | Dec. 23, 1952 |